United States Patent [19]
Vinh

[11] 3,817,304
[45] June 18, 1974

[54] CUTTING TOOL FOR PARTS MADE OF WOOD OR SIMILAR MATERIAL

[75] Inventor: Louis-André Duong Vinh, Auxerre, France

[73] Assignee: Establissements Guilliet, Auxerre, France

[22] Filed: Aug. 31, 1971

[21] Appl. No.: 176,571

[30] Foreign Application Priority Data
Sept. 7, 1970 France.............................. 70.32415
July 2, 1971 France.............................. 71.24229

[52] U.S. Cl............ 144/136 R, 144/136 C, 30/355, 145/1 R, 145/31 C, 83/5
[51] Int. Cl......... B27f 5/00, B27f 1/02, B27g 17/00
[58] Field of Search.................... 144/136 C, 136 R; 145/31 C, 1 R; 30/35 S; 83/5, 1

[56] References Cited
UNITED STATES PATENTS
1,998,114  4/1935  Arends............................. 145/31 C
2,537,555  1/1951  Sloan.................................. 30/355

FOREIGN PATENTS OR APPLICATIONS
592,234  9/1947  Great Britain...................... 30/355
1,354,163  1/1964  France............................ 144/136 C Primary Examiner—Donald R. Schran
Attorney, Agent, or Firm—Clelle W. Upchurch

[57] ABSTRACT

Tool for working wood or similar materials comprising a body of elongated shape as well as at least one cutting part projecting out with respect to the body, and whose cutting direction is parallel to the latter's length, in which the cutting part provides a cutting edge which diverges backwards obliquely from the body with respect to the direction of advance of the tool, comprising at least one cutting part providing a cutting edge having a profile of concave festoons.

11 Claims, 7 Drawing Figures

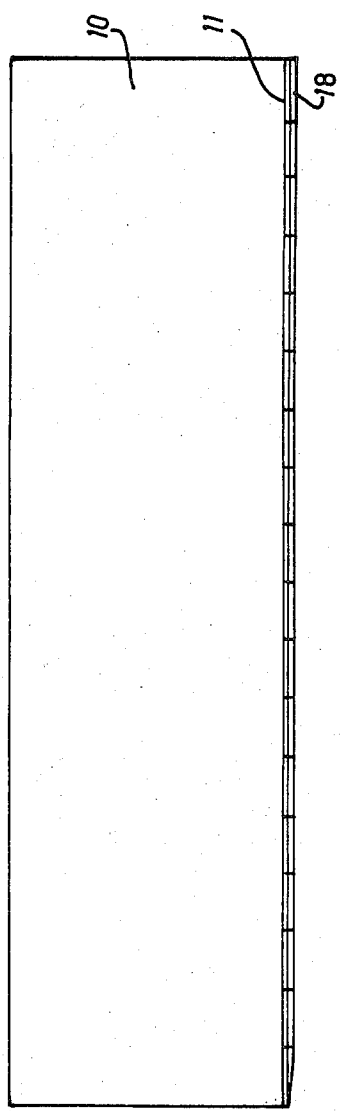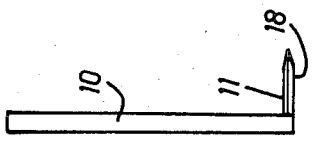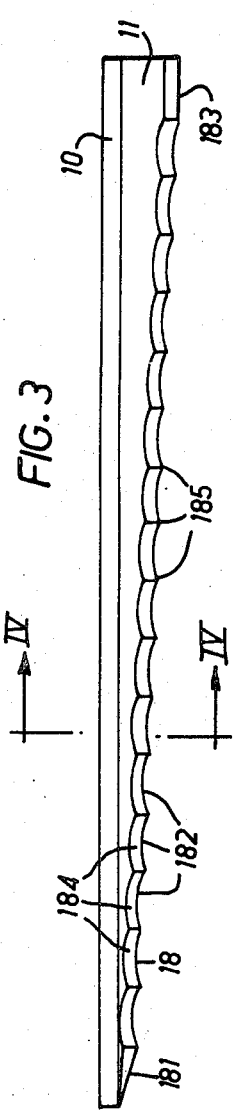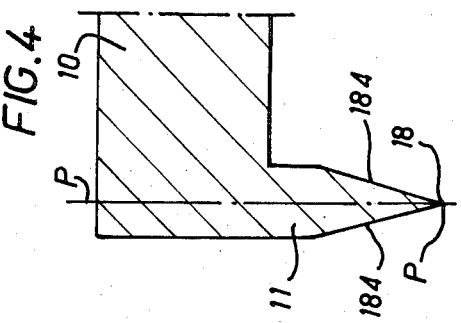

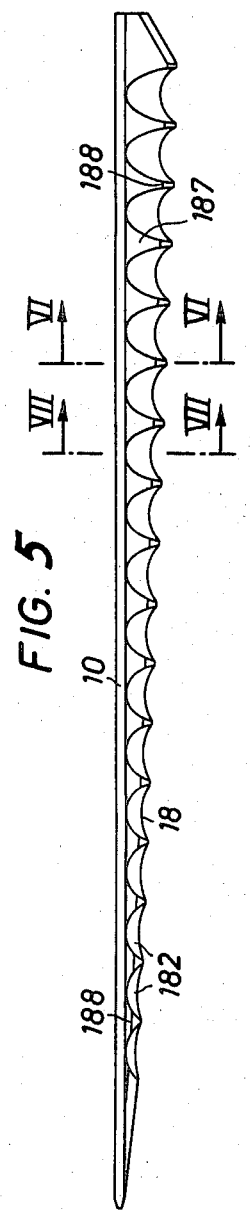
FIG. 5
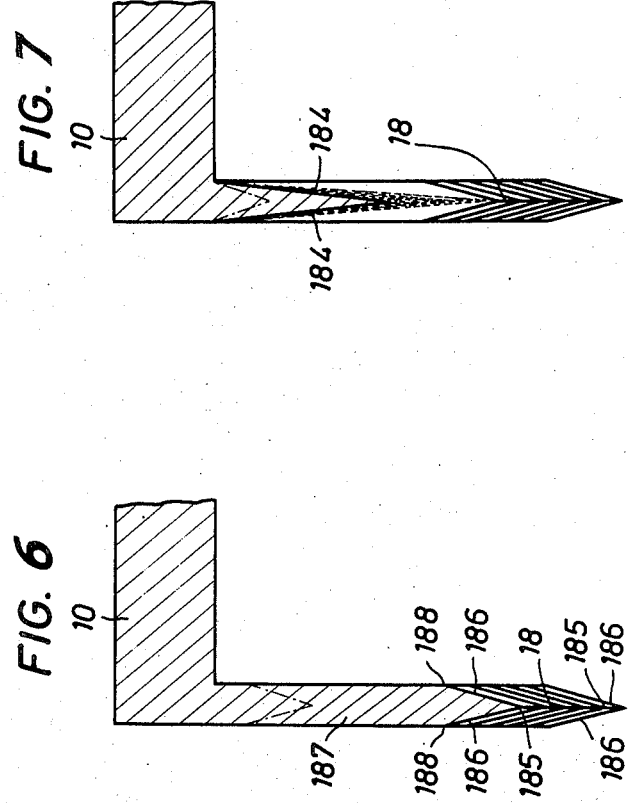
FIG. 6
FIG. 7

CUTTING TOOL FOR PARTS MADE OF WOOD OR SIMILAR MATERIAL

A tool is known for working wood or similar materials, comprising a body of elongated shape as well as at least one cutting part projecting out with respect to the body and whose cutting direction is parallel to the latter's length.

According to one embodiment of this tool, the cutting part has a cutting edge which diverges obliquely backwards from the body with respect to the direction of advance of the tool.

The object of this invention is to improve such a tool, in particular, so as to decrease the friction between the tool and the materials worked with it, without appreciably reducing the rigidity of the tool.

To this effect, the invention relates to a tool of the above-mentioned type in which the cutting edge of the tool (or, as the case may be, several of the cutting edges of this tool) has a profile of concave festoons defining the information of cutting teeth, which are preferably equidistant.

In a preferred embodiment, the festoons are adjacent to grooves provided symmetrically and obliquely in the cutting part with respect to the latter's median plane.

In a preferred embodiment, the grooves extend to the body of the tool.

In a further preferred embodiment, the teeth are defined between two adjacent festoons by grooves of equal inclination on the median plane of the cutting part and which project on the body of the tool, which projection increases in the direction of advance of the tool.

The angle at the top of the cross-section of the teeth is preferably constant, and, in addition, the thickness of the base of the tooth is also constant. On the other hand, the width of the base of the teeth decreases progressively in the direction of advance of the tool.

In a particularly advantageous embodiment, the angle at the top of the cross-section of the festoons, at their middle, decreases progressively in the direction of advance of the tool.

In this embodiment, the tool is hollowed out as much as possible between two successive teeth which alone have a cutting action and friction is limited to that of the teeth themselves to the exclusion of the interval between them. The entire unit, however, maintains an excellent rigidity due to the fact that the base, i.e., the zone providing for junction to the body of the tool, maintains a maximum and constant thickness over the entire length of the tool.

The following description accompanying the appended drawing given as non limiting example will provide a good understanding as to how the invention may be put into practice.

FIG. 1 is a lateral front view;

FIG. 2 is an end view and FIG. 3 is a plan view of a tool according to the present invention;

FIG. 4 is a partial section, to a larger scale, along IV—IV in FIG. 3;

FIG. 5 is a diagrammatic front view of a varying embodiment of a tool according to the invention;

FIG. 6 is a sectional view to a larger scale along line VI—VI of FIG. 5;

FIG. 7, finally, is a sectional view to the same scale as that of FIG. 6 along line VII—VII of FIG. 5.

Reference will first be made to FIGS. 1 to 4.

In the example of an embodiment shown in the drawing, body 10 of the tool, consisting of a relatively thin blade with a parallel face, is integral with a cutting part 11 directed at right angles with respect to the body.

This cutting part ends in a cutting edge 18 which starts out from the forward end of the body and diverges backwards little by little from the latter, as shown in FIG. 3.

The cutting edge provides first an oblique and rectilinear leading portion 181, in the immediate vicinity of body 10, and then a profile of concave festoons 182, which are preferably identical, and then ends in a rectilinear portion 183.

In the example shown, the leading portion forms an angle of approximately 20° with the general direction of the tool body while the festoon part and the back portion form with this body an angle of several degrees only. Festoons 182 are relatively flat, the ratio of their rise to their chord being, for example, of the order of 0.1. They are formed by grooves 184, provided obliquely in the cutting part 11, symmetrically with respect to the median plane P of the latter. These grooves are cylindrical or slightly truncated. They are inclined, for example, by approximately 15° on plane P. They define the formation of cutting and obtuse teeth 185, which are equidistant from one another.

The above ratios and angles have been mentioned as examples only. They can vary very widely as a function of requirements in various particular cases.

The presence of festoons decreases friction in the score effected by the tool in the material, in comparison with the continuous cutting edge tool, while providing an almost equivalent rigidity.

Reference will now be made to FIGS. 5 to 7.

In this varying embodiment, festoons 182 consist of grooves 184 (FIG. 7) which are extended up to the vicinity of body 10.

Teeth 185, provided between each festoon, are formed by grooves 186 (FIG. 6) comprising equal and constant inclinations on the median plane of the cutting part. The angle at the top of the various teeth is therefore constant as shown in FIG. 6. The teeth have a thickness at the base 187 which is constant, so that, as the teeth progressively decrease, the length at the base 188 (in the direction of advance of the tool), progressively decreases in the direction of advance of the tool.

According to another characteristic of this embodiment, the angle between grooves 184 of the festoons progressively decreases in the direction of advance of the tool. FIG. 7 shows as a dotted line a cross section of a preceding festoon (in the direction of advance of the tool), a cut festoon, as well as the following festoons.

The interval between two consecutive teeth, shown in the drawing as being constant, can, on the contrary, be variable.

The thickness at the base of the cutting part, at the junction with body 10, is constant and equal to thickness 187 of the teeth. An excellent rigidity of the entire unit is thus obtained while friction between the tool and the part is considerably reduced.

In using the tool provided by the invention, a groove is first cut in a piece of wood to be cut by any known tool such as a saw as described in my co-pending application Ser. No. 124,779 filed Mar. 16, 1971. Then, the body of the tool provided by the invention may be inserted in the groove and moved relative to the wood from the groove. The cutting edge separates the fibers of the wood along its edge as the tool is moved relative thereto.

The tool may be held by hand or it may be supported on a stationary frame and the wood moved relative thereto.

What I claim is:

1. Tool for working wood or similar materials comprising a body of elongated shape as well as at least one cutting part projecting out with respect to the body, and whose cutting direction is parallel to the latter's length, in which the cutting part provides a cutting edge which diverges backwards obliquely from the body with respect to the direction of advance of the tool, comprising at least one cutting part providing a cutting edge having a profile of concave festoons.

2. Tool according to claim 1, wherein the festoons are adjacent to provide in the cutting part symmetrically and obliquely with respect to the median plane of the latter.

3. Tool according to claim 1 wherein the festoons are preceeded and followed by rectilinear cutting edge portions.

4. Tool according to claim 1, wherein the grooves comprising the festoons extend to the body of the tool.

5. Tool according to claim 4, wherein the teeth are defined between two adjacent festoons by grooves of equal inclination on the median plane of the cutting part and which project on the body of the tool, which projection increases in the direction of advance of the tool.

6. Tool according to claim 4, wherein the angle at the top of the cross-section of the teeth is constant.

7. Tool according to claim 4, wherein the thickness of the base of the tooth is constant.

8. Tool according to claim 4, wherein the width of the base of the teeth progressively decreases in the direction of advance of the tool.

9. Tool according to claim 4, wherein the angle at the top of the cross-section of the festoons, at their middle, progressively decreases in the direction of advance of the tool.

10. Tool according to claim 4, wherein the interval between two successive teeth is not constant.

11. A cutting tool comprising an elongated body having a leading end and a trailing end and co-operating with a groove previously provided in the piece to be cut, a cutting blade carried by the body along one edge thereof, said cutting blade being substantially perpendicular to the body, said cutting blade forming an enclosed acute angle with the body adjacent to the leading end of the body and having a rectilinear segment adjacent to the trailing end of the body, said cutting blade having a series of concave segments intersecting to form substantially equally spaced teeth, said teeth tapering in thickness from adjacent the base thereof to a point at the tip thereof.

* * * * *